US009578223B2

(12) United States Patent
Luo et al.

(10) Patent No.: US 9,578,223 B2
(45) Date of Patent: Feb. 21, 2017

(54) SYSTEM AND METHOD FOR CAPTURING IMAGES WITH MULTIPLE IMAGE SENSING ELEMENTS

(71) Applicant: Qualcomm Incorporated, San Diego, CA (US)

(72) Inventors: Jiafu Luo, Irvine, CA (US); Peng Lin, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 13/972,742

(22) Filed: Aug. 21, 2013

(65) Prior Publication Data

US 2015/0054992 A1    Feb. 26, 2015

(51) Int. Cl.
H04N 5/225 (2006.01)
H04N 5/355 (2011.01)
H04N 5/3745 (2011.01)

(52) U.S. Cl.
CPC ........ *H04N 5/2258* (2013.01); *H04N 5/35554* (2013.01); *H04N 5/35563* (2013.01); *H04N 5/37457* (2013.01)

(58) Field of Classification Search
CPC  H04N 5/2355; H04N 5/23554; H04N 5/2354; H01L 27/14641
See application file for complete search history.

(56) References Cited

U.S. PATENT DOCUMENTS

| 7,026,596 | B2 | 4/2006 | Fossum |
| 7,616,231 | B2 | 11/2009 | Farrier |
| 7,847,231 | B2 | 12/2010 | Hirose |
| 8,159,585 | B2 | 4/2012 | Parks et al. |
| 2004/0096124 | A1 | 5/2004 | Nakamura |
| 2006/0192867 | A1* | 8/2006 | Yosefin ........................ 348/273 |
| 2007/0206110 | A1 | 9/2007 | Wada |
| 2007/0285547 | A1* | 12/2007 | Milligan ................ H04N 3/155 348/308 |

(Continued)

FOREIGN PATENT DOCUMENTS

EP    2009911 A2    12/2008

OTHER PUBLICATIONS

International Search Report and Written Opinion—PCT/US2014/050506—ISA/EPO—Oct. 17, 2014.

(Continued)

*Primary Examiner* — Ahmed A Berhan
(74) *Attorney, Agent, or Firm* — Knobbe, Martens, Olson & Bear, LLP

(57) ABSTRACT

Methods, devices, and computer program products for CMOS visible image sensors incorporating multiple image sensing elements with different integration times to extend dynamic range are disclosed herein. In one aspect, a method of taking an image using a CMOS visible image sensor that includes at least one first light sensing element with a first well capacity and at least one second light sensing element with a second well capacity, where the second well capacity is greater than the first well capacity is disclosed. The method includes determining a first integration time for each of the at least one first light sensing elements. The method further includes determining a second integration time for each of the at least one second light sensing elements, where the second integration time is different than the first integration time.

29 Claims, 9 Drawing Sheets

(56) References Cited

U.S. PATENT DOCUMENTS

2011/0013064 A1* 1/2011 Lahav .................... H04N 5/335
 348/296
2012/0241591 A1 9/2012 Wan et al.
2013/0076953 A1 3/2013 Sekine

OTHER PUBLICATIONS

Chun J.B., et al., "Dynamic-Range Widening in a CMOS Image Sensor through Exposure Control Over a Dual-Photodiode Pixel," Electron Devices, IEEE Transactions, 2009, vol. 56 (12), pp. 3000-3008.

* cited by examiner

SYSTEM AND METHOD FOR CAPTURING IMAGES WITH MULTIPLE IMAGE SENSING ELEMENTS

FIELD

The present application relates generally to digital imaging, and more specifically to systems, methods, and devices for visible image sensors which include multiple image sensing elements to extend dynamic range.

BACKGROUND

In digital imaging, the dynamic range of a complementary metal-oxide-semiconductor (CMOS) sensor may, at times, be insufficient to accurately represent outdoor scenes. This may be especially true in the more compact sensors which may be used in mobile devices, such as in the camera on a mobile telephone. For example, a typical sensor used in a mobile device camera may have a dynamic range of approximately 60-70 dB. However, a typical natural outdoor scene can easily cover a contrast range of 100 dB between light areas and shadows. Because this dynamic range is greater than the dynamic range of a typical sensor used in a mobile device, detail may be lost in images captured by mobile devices.

Previous attempts to extend the dynamic range of image sensors each have their own advantages and their own disadvantages. For example, some previous approaches involve combining two frames, one with a shorter exposure time and one with a longer exposure time. In this approach, the frame with the longer exposure time may be used to show details in dark regions while the frame with the shorter exposure time may be used to show details in bright regions. This approach may yield good results for objects which are stationary, and may produce excellent wide dynamic range (WDR) pictures. Unfortunately, when moving objects are photographed, the time difference between the two different frames used to create such an image may cause motion ghost effect. This approach may also require a full frame memory in such a device.

To reduce such motion artifact, another approach is to start the integration of the short exposure frame immediately after readout of the long exposure frame. To explain how this scheme works, let us assume the short exposure time is S line-time and the long exposure time is L line-time. With a typical rolling shutter operation, an imager will start integration of first row at time 0 and then second row at one line-time later, and so on. At time L line-time, we will readout the first row for the long-exposure frame and immediately start integration for the second, short exposure frame, followed by readout and reset of second row one line-time later, and so one. Thus, for example, at time L+S line-time, a readout of the short exposure frame of row 1 will occur, while at time L+S+1, a readout of row 2 of the short exposure frame will occur. This continues until both frames are read out completely. While motion artifact may be reduced compared to the previous approach, this approach will still require S lines of memory buffer in order to reconstruct the complete WDR frame.

In order to minimize motion artifacts from dual-frame approaches and to reduce amount of required line buffers, a different scheme may be used where different integration times are implemented within the same readout frame. For example, one possible scheme is to have two rows having a longer integration time, $T_{long}$, and another two rows having a shorter integration time, $T_{short}$. This scheme may be used for color sensing imagers where the color filter sub-pattern usually comes in pairs, such as the well-known Bayer pattern, which has a 2×2 sub-pattern with two green pixels in one diagonal and a red and a blue pixel on the other diagonal, as illustrated in FIG. 1.

Similar to other approaches, the rows with $T_{long}$ are used to show details in dark regions while rows with $T_{short}$ are used to show details in bright regions. With such approach, motion artifacts are minimized and no line buffer is needed. However, this approach will result in resolution loss in the vertical direction. Another improved approach is presented in U.S. Pat. No. 8,059,174 where the long and short integration time are tightly interleaved, i.e., some pixels in a row will have longer integration time while the other pixels in the same row will have shorter integration time, resulting in a much better resolution in the vertical direction. However, this still results in some resolution loss, in both vertical and horizontal directions. In a similar scheme, one row of pixels with long integration time may be used and the next row of pixels may have short integration time, with both pixels having the same color filter. However, this approach results in a different aspect ratio and vertical resolution loss.

Yet another approach to this problem may be to use non-linear response pixels, such as logarithmic pixels. While such pixels provide very high native dynamic range, images created using these pixels suffer from other issues, such as higher fixed-pattern noise (FPN).

Besides different integration time, other techniques such as in-pixel manipulations can also be implemented to achieve WDR. For example, in the so-called lateral overflow integrated capacitor (LOFIC) scheme, a small capacitor is added in each pixel to accumulate charges when a particular pixel is near saturation. In this scheme, higher dynamic range may be achieved at the expense of a more complex layout.

In each of these schemes, each pixel has one light sensing element and the pixels are usually arranged in a square pattern, with same increment in both horizontal and vertical direction.

Another possible scheme is illustrated by U.S. Pat. No. 7,019,274, which shows a scheme in which a small light sensing element and a large light sensing element are incorporated in each pixel. By adjusting the light shield on top of the pixel to allow more exposure to the larger element and less exposure to the small element, the combined picture can have higher dynamic range. For such approach, however, the dynamic range extension is fixed once an imager is fabricated because the dynamic range extension depends only on the ratio of small and large elements and their aperture ratio. In practice, however, for different scenes, different dynamic ranges are needed. For example, in low light situations, it may be preferable to not use any high dynamic range image information, and instead, it may be desirable to expose each pixel to as much light as possible in order to achieve higher signal to noise ratio (SNR). However, the scheme used in U.S. Pat. No. 7,019,274 may not be optimized for such different schemes.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include capturing images with multiple light sensing elements.

In some aspects, a method of capturing an image with an image sensor that includes at least one first light sensing element with a first well capacity and at least one second light sensing element with a second well capacity, wherein the second well capacity is greater than the first well capacity is disclosed. The method comprises determining a first integration time for each of the at least one first light sensing elements; and determining a second integration time for each of the at least one second light sensing elements, where the second integration time is different than the first integration time.

In one aspect, an electronic device is disclosed. The device comprises a CMOS visible image sensor including at least one first light sensing element with a first well capacity and at least one second light sensing element with a second well capacity, where the second well capacity is greater than the first well capacity; and a processor configured to: determine a first integration time to be used for each of the at least one first light sensing elements; and determine a second integration time to be used for each of the at least one second light sensing elements, where the second integration time is different than the first integration time.

In one aspect, an electronic device is disclosed. The device comprises means for determining a first integration time for each of at least one first light sensing elements with a first well capacity included in a CMOS visible image sensor; and means for determining a second integration time for each of at least one second light sensing elements with a second well capacity included in the CMOS visible image sensor, where the second integration time is different than the first integration time and where the second well capacity is greater than the first well capacity.

In one aspect, a non-transitory, computer readable medium comprising instructions that when executed cause a processor in a device to perform a method of taking an image using a CMOS visible image sensor that includes at least one first light sensing element with a first well capacity and at least one second light sensing element with a second well capacity, the second well capacity greater than the first well capacity is disclosed. The method comprises determining a first integration time for each of the at least one first light sensing elements; and determining a second integration time for each of the at least one second light sensing elements, where the second integration time is different than the first integration time.

DETAILED DESCRIPTION

Figure 1:
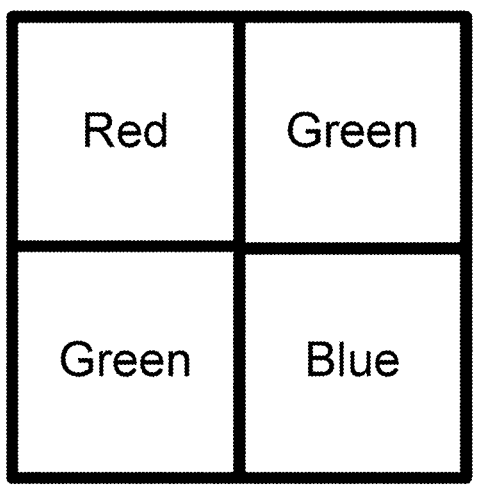
FIG. 1 is an illustration of a Bayer color filter pattern.

Embodiments relate to methods and systems for extending the dynamic range of visible image sensors. One embodiment includes CMOS-based visible image sensors that incorporate dual diode pixels with different integration times to extend the dynamic range of the image sensor. Extending the dynamic range of a visible image sensor may be important as a sensor used on a typical mobile device may have an insufficient dynamic range to capture the full dynamic range of outdoor images. In some embodiments, the CMOS sensor may have an increased dynamic range by incorporating a dual-diode design. Such a design may include, for example, a larger photodiode that has a greater well capacity in order to absorb more light and provide more detail in darker areas of an image, and a smaller photodiode that has a smaller well capacity in order to provide more detail in bright areas of an image.

The total amount of charge that a light sensing element, such as a photodiode, can hold is called the well capacity, and is measured in electrons. The well capacity of a light sensing element relates to the dynamic range of that element, typically measured in decibels. The dynamic range, the ratio between the well capacity and noise floor, is a measure of how well a sensor can measure an accurate signal at low light intensities all the way up until it reaches full well capacity. Given a similar noise floor, the dynamic range of a sensing element is proportional to its well capacity, which is typically proportional to the size of such light sensing elements.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As discussed above, it may be desired to extend the dynamic range of image sensors, or imagers, in order to take pictures of scenes that include both bright areas and dark areas. This may be especially true for small pixel sizes, as smaller pixels may have a lessened full well capacity (FWC) for each pixel. For example, a typical image sensor used in a mobile phone camera has a dynamic range between 60-70 dB, while a typical natural scene can easily covers a contrast range of 100 dB. Thus, methods to extend the dynamic range of a captured image are required to maintain contrast fidelity of such pictures.

Figure 2:
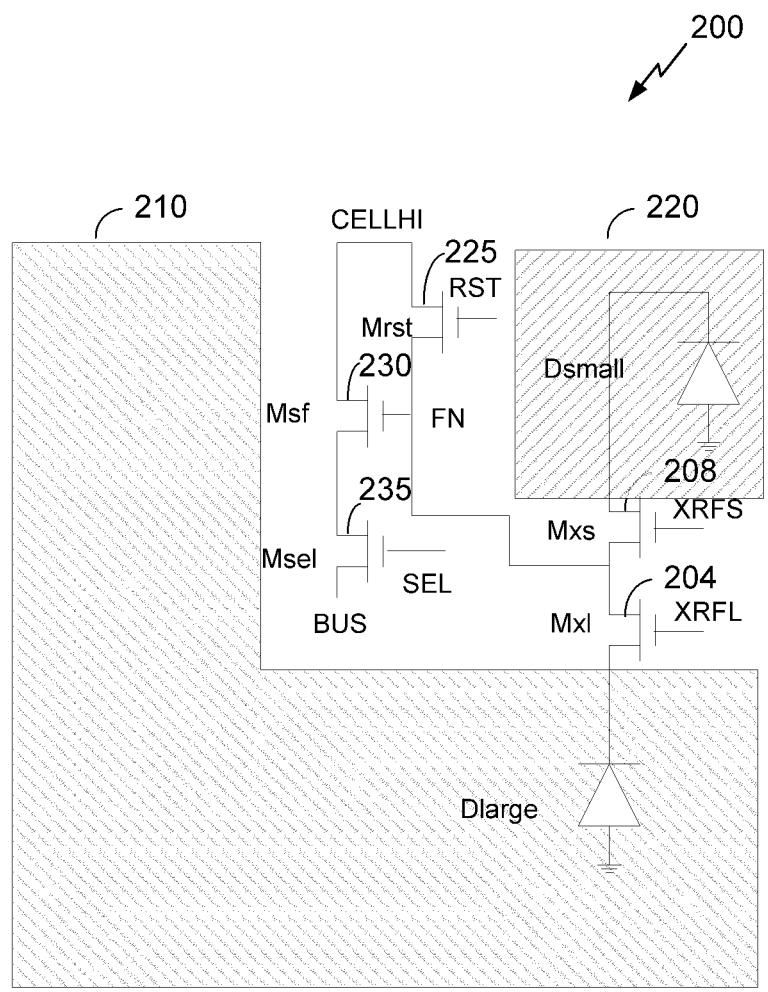
FIG. 2 is an exemplary schematic diagram of a two-diode pixel.

Accordingly, embodiments relate to image sensors wherein one or more pixels are comprised of light sensing elements of differing well capacities. These image sensors therefore can capture images with a high dynamic range by using a combination of different sensing elements, as discussed below to accurately capture low light, and high light image portions within the same captured image frame. One method which may be used to provide increased dynamic range while avoiding some of the drawbacks of the above methods may be to provide a visible image sensor with two light sensing elements per pixel, one small light sensing element and one large light sensing element. FIG. 2 is an exemplary schematic diagram 200 of a two-diode pixel. As discussed below, pinned photodiodes may be used as an example for such light sensing elements, although it should be clear to one of skill in the art that other light sensing elements may also be used. Thus, each pixel may include a large photodiode and a small photodiode. In this diagram of the pixel 200, the large photodiode 210 may be referred to as Dlarge, while the small photodiode 220 may be referred to as Dsmall. The pixel 200 may further include other readout elements, which can work for either each photodiode separately, or both diodes may share some common readout elements. This may lead to an increased fill factor of the photodiodes. These pixels may be repeatedly instantiated in a horizontal direction, with a fixed pixel pitch, in order to form one row of pixels. Each imager may include a number of rows or such pixels, with substantially the same pixel pitch in a vertical direction as in the horizontal direction, in order to form a two-dimensional pixel array.

Visible image sensors that include pixels with different sensing elements, such as pixel 200, may differ from prior sensors in a number of ways. For example, the large photodiode 210 and the small photodiodes 220 of the visible image sensor may have different integration times. For example, these integration times may be represented as TL, for the integration time of the large photodiode 210, and TS, for the integration time of the smaller photodiode 220. The larger photodiode 210 may have a longer integration time than the small photodiode 220. This may allow the larger photodiode 210 to show details in darker regions of images, while the small photodiode 220 may be better able to show details in brighter regions of images.

Such a circuit may be based on a low-noise 4-transistor (4T) pixel, and may include separate transfer gates, Mxl 204 and Mxs 208, for the large and small diodes, Dlarge 210 and Dsmall 220, respectively. As illustrated by the shaded areas for the large photodiode, Dlarge 210, and the small photodiode, Dsmall 220, the diodes may have different sizes, with a larger size for Dlarge 210. While an irregular shape is illustrated for Dlarge 210 here, in some aspects, it may be preferable to have a more well-controlled shape for each diode, such as a rounded rectangular shape, in order to facilitate charge transfer. Other circuits supporting the pixel may include a reset transistor, Mrst 225, and a readout branch, consisting of a source follower transistor, Msf 230, and a row select transistor, Msel 235.

Figure 3:
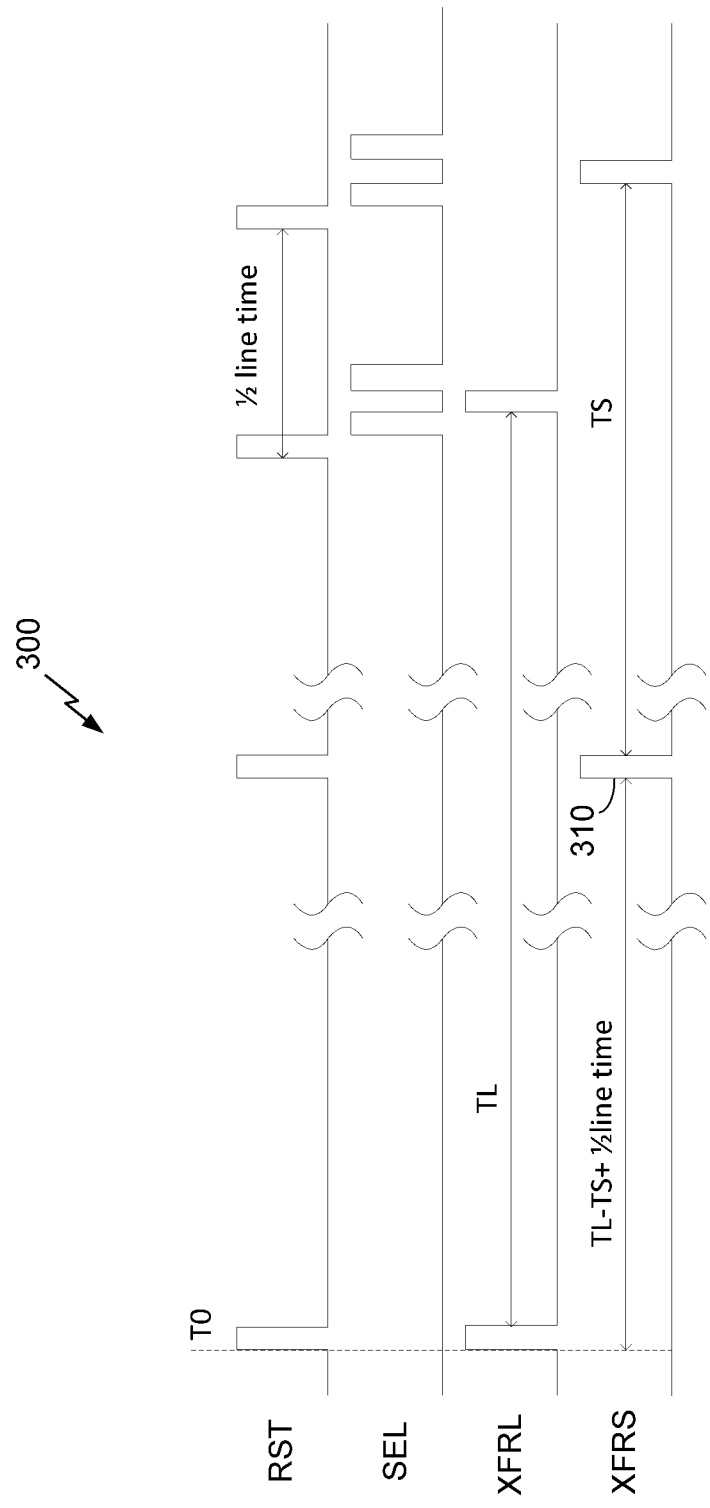
FIG. 3 is an exemplary timing diagram of a two-diode pixel to enable dynamic range extension.

FIG. 3 is an exemplary timing diagram 300 of a two-diode pixel such as that shown in FIG. 2. In this type of pixel, incoming photons are converted to electron and hole pairs in a silicon substrate. The photo-electrons are then collected by the two photodiodes, Dlarge 210 and Dsmall 220. The integration for the large photodiode, Dlarge 210, begins at time T0. At this time, both RST and XRFL may be high for a certain amount of time, turning on both transistors Mrst 225 and Mxl 204. This may empty all electrons in Dlarge 210 and may set Dlarge 210 to a predetermined voltage. Once XRFL is set to a low voltage, Mxl 204 turns off, and Dlarge 210 begins collecting photo-electrons and its voltage decreases. In general, the rate of such photo-electron accumulation is proportional to the amount of incoming light shining on Dlarge 210 and therefore is a function of both light intensity and photodiode area.

As mentioned before, Dlarge 210 may be configured to collect light for time TL. Simultaneously with Dlarge 210 collecting electrons, Dsmall 220 may also collect electrons, but these may not be used. At time T0+TL−TS+½ line time 310, the small photodiode, Dsmall 220, may be reset by setting both RST and XFLS to a high value. This reset may discard any photoelectrons that Dsmall 220 has collected, and allow Dsmall 220 to begin collecting photoelectrons again. Dsmall 220 may be configured to collect light for time TS.

At the end of the integration time, a correlated double sampling (CDS) operation may be employed to readout the accumulated charge on a diode. In order to do this, first Mrst 225 is turn on by setting RST high, which sets the floating node (FN) to a reset voltage (CELLHI bias-threshold of Mrst 225). After this, SEL signal may be set high, which may turn on Msel 235 in order to enable pixel readout. If BUS is connected to a current source, then Msf 230 acts as a source follower, resulting in BUS voltage tracking the voltage of the FN. Once the reset voltage of the FN has been readout, Mxl 204 is turned on by setting XRFL high, dumping all collected photo-electrons in Dlarge 210 to the FN, thus reducing the voltage of the FN. After this, BUS voltage may follow the reduced voltage of the FN, and a second readout may be performed through the source follower, if SEL is set high. The difference between both readouts may be used to determine an exact voltage change on node FN due to photo-electrons collected by Dlarge 210. Additional column circuits may also be used in order to store such information, and in order to enable further processing, such as amplification, digitization, and other processing. In general, CDS operation may reduce the impact of transistor variation and certain temporal noises which may be present. In some aspects, the time difference between the two XRFL pulses, one for reset and one for readout, may represent the integration time of the large photodiode, TL. Once the large photodiode, Dlarge 210, has been readout, about ½ line time later, another CDS operation may be carried out to readout the small photodiode, Dsmall 220. This operation may be similar to the operation described above with regards to the large photodiode Dlarge 210. In the CDS operation to readout Dsmall 220, Mxs 208 may be turned on by setting XFRS high for the small photodiode small 220. In integrating for Dsmall 220, the time between the two XFRS pulses is the integration time of Dsmall 220, TS.

When using the readout scheme illustrated in FIG. 3, there may be a time difference between readout of the large photodiode 210 and the small photodiode 220 of about ½ line time. Therefore, a one line buffer may be needed to store the information from the large photodiode 210. Once the small photodiode 220 from a given pixel is readout, it may be combined with the result from the associated large photodiode 210 in order to form a final pixel output value. Therefore, the additional memory requirement from this two-diode configuration is minimal.

Figure 4:
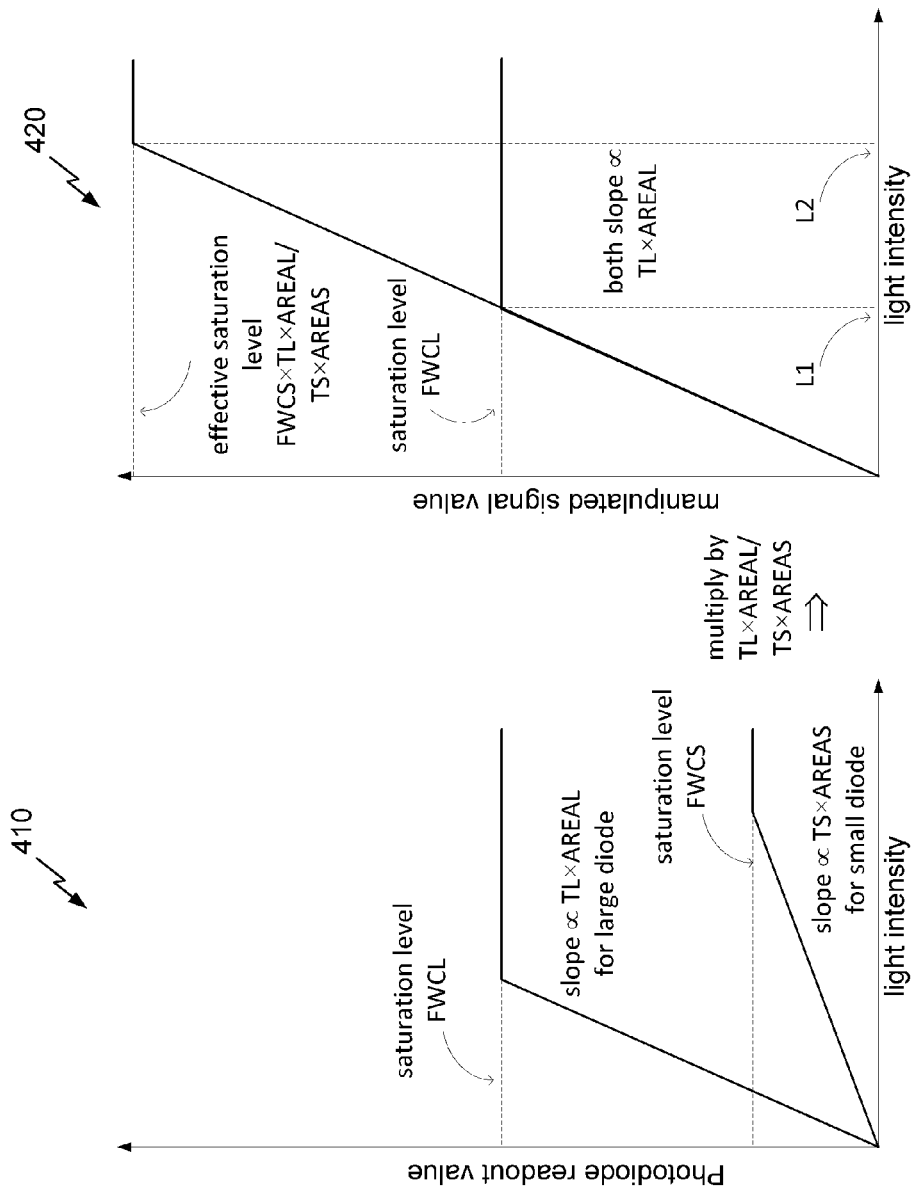
FIGS. 4A and 4B are illustrations of the principle of dynamic range extension.

FIGS. 4A AND 4B illustrate the principle of dynamic range extension. FIG. 4A illustrates a plot 410 of an original readout value from the photodiodes shown in FIG. 2. The x-axis is the light intensity shining on the pixel. For the large photodiode, Dlarge 210, the accumulated signal is proportional to the product of integration time, TL, and light collecting area, AREAL. For the small photodiode 220, its signal is proportional to TS×AREAS with AREAS being its light collecting area of Dsmall 220. Since each photodiode has a saturation level, FWCL and FWCS, respectively, once light intensity is above a certain level, shown as L1 & L2 in plot 420, respectively, the photodiode won't be able to collect any more charges and its output is then clipped. By using a combination of both Dsmall 220 and Dlarge 210, this dynamic range may be extended. By using known values of the above parameters, the signal value of the small photodiode 220 may be multiplied by a factor of TL×AREAL/(TS×AREAS), which results in the plot 420 shown in FIG. 4B. Thus, by using a two-diode sensor, the saturation of the small photodiode may be pushed to FWCS×TL×AREAL/(TS×AREAS), which may result in extension of pixel dynamic range by choosing an appropriate ratio of TL to TS.

A number of methods may be used to combine the readout values from both photodiodes. For example, when output of the large photodiode 210 (FIG. 2) is below saturation, this value may be used as the final pixel output. However, as this value approaches its saturation level, the value of the pixel may be manipulated to instead be the output of the small photodiode. More complex algorithms may also be used to take advantage of the output of both diodes. For example, one more complex algorithm which combines the two readout images into a linear HDR image is described as follows:

Let T1 and T2 denote the readout images of the large and small photodiodes, and corresponding to TL and TS, respectively. Let R=(TL/TS)×(AREAL/AREAS). Let MAD denote the local Mean Absolute Difference value between T1 and R×T2, defined as following:

$$MAD(x, y) = \left( \sum_{i,j \in W(x,y)} |T1(i, j) = R \times T2(i, j)| \right) / N,$$

where W(x,y) is a m×n window centered at pixel (x,y); N is the total number of pixels within the window W(x,y). Let α(x,y) be defined as:

$$\alpha(x, y) = \frac{1}{1 + e^{-a(MAD(x,y)-b)}},$$

where a and b are tuning parameters which control the transition width between the photodiodes.

Figure 5:
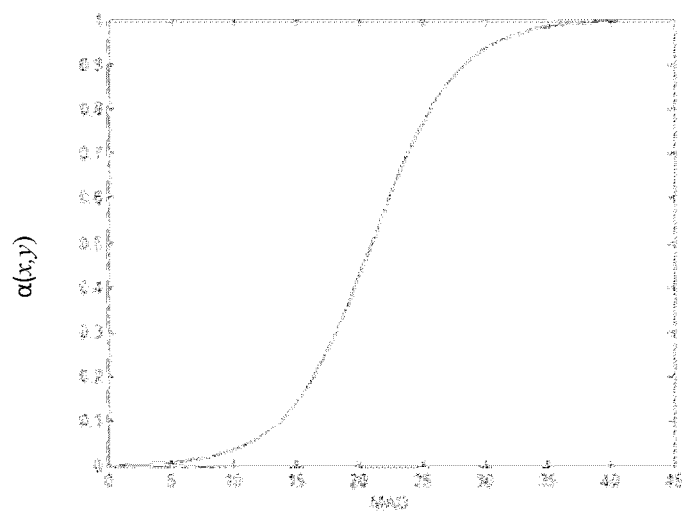
FIG. 5 is a graph of $\alpha(x,y)$, which illustrates the function for combining the readout values from two photodiodes.

FIG. 5 is a graph of function α as a function of MAD, the local Mean Absolute Difference value between T1 and R×T2. With the function α(x,y), the combined T1 and T2 image, Thdr, can be expressed as:

$$T_{hdr}(x,y) = (1-\alpha(x,y)) \cdot T1(x,y) + \alpha(x,y) \cdot T2(x,y)$$

The above function will smoothly switch T1 to T2 when T1 is saturated or when motion is presented. This can be observed from the graph of α in FIG. 5: When T1 is saturated, MAD values become large, then α will be close to 1, therefore Thdr will be close to T2. Similarly, when there is motion presented, MAD will be large and a will be close to 1, therefore Thdr will be close to T2 as well.

Assuming a noise floor of N0, with the above recombination scheme, the dynamic range of a pixel can be expressed as:

$$DR_{new} = 20 \times \log\left( \frac{FWCS}{N0} \times \frac{TL}{TS} \times \frac{AREAL}{AREAS} \right)$$

For comparison, if the same pixel was implemented with a more conventional approach of a single diode, it can be assumed that an even larger photodiode may be implemented for the same pixel pitch with a combined saturation level in the order of FWCS+FWCL. As a result, its dynamic range might be:

$$DR_{old} = 20 \times \log\left( \frac{FWCS + FWCL}{N0} \right)$$

To compare different dynamic ranges from these two approaches, it may be assumed that the full well capacity of such a photodiode may be somewhat proportional to the photodiode area of the pixel. Thus, if it is assumed that the light collecting area of this photodiode is about the same as the diode area, the dynamic range of a pixel with a dual-diode may be:

$$DR_{new} \approx 20 \times \log\left( \frac{FWCL}{N0} \times \frac{TL}{TS} \right)$$

Because TL/TS can be larger than 1+FWCS/FWCL, DRnew may be higher than DRold. Thus, this approach may improve the dynamic range of a light-sensing pixel.

Because both TL and TS can be dynamically programmed, one advantage of this disclosure may become clear: the maximum dynamic range of a system can easily be increased by programming a larger TL/TS ratio. However, for light intensity levels between L1 and L2, assuming that TL and TS are fixed, SNR of such a pixel may be lower because information from the saturated large photodiode may no longer be used. When signals from only the smaller photodiode are used, a higher noise level may be present. Thus, in order to maintain SNR levels while extending dynamic range only to what is necessary, it may be beneficial to implement an exposure control to adjust TL and TS separately.

One way to adjust TL and TS may be as follows. First, TL and TS may be set to the same value. From this, TL's statistics data for auto exposure control may be used, just as an auto exposure control may be used in a regular sensor.

When the brightness level reaches a target brightness level, the TL image may be checked for clipping pixels. A predefined threshold value of clipping pixels may be used, and the number of clipping pixels in the image may be compared to this threshold value. If the count of clipping pixels in the TL image is less than the predefined threshold value, then the TL exposure length may be sufficient, and TS may be kept equal to TL. In this case, the values from the TS pixels may not be used, as the values from TL may be used instead. However, if the count of clipping pixels in the TL image is greater than the predefined threshold value, the TS exposure time may be decreased and a count of the clipping pixels in the TS image may also begin. In some aspects, the TS may be decreased only to a level such that the count of the clipping pixels in the TS image is below a second predefined threshold value. In other words, the TS pixels may be used in such a way so that the extended dynamic range just covers the scene dynamic range. This way, the SNR will be maintained in a relatively higher level.

For a 2-D pixel array, sometimes with millions of pixels, it may not be possible to connect to these different control signals mentioned above of an individual pixel. In a typical design, SEL, RST, XRFL, and XFRS may be horizontal buses shared by one row of pixels while BUS is a vertical bus shared by one column of pixels. In the example here, CELLHI itself is the same for all pixels in the 2-D array and therefore can be either horizontal or vertical buses. As a result of such implementation, one row of pixel will have the same TL and TS integration times, for large and small photodiodes, respectively.

The generation of RST, SEL, and different XFR signals are typically controlled by a vertical timing generator. Either shift register based or decoder based design can be used for such purpose. If a shift register-based approach is used, an additional pointer signal and one set of shift registers will be needed to generate the delayed XFRS signal to control the small photodiode. For a decoder-based approach, additional counters or similar logic may be needed to generate such signals. However, the additional silicon area required for such task is very small for each row.

While high dynamic range is needed for taking pictures in well illuminated scenes, under low light situations, such extended dynamic range may not be needed. Instead, higher SNR may be achieved by operating the dual-diode pixel described above under a different mode, in which the same integration time is used for both TS and TL. In-pixel binning, i.e., dumping charges from both photodiodes, Dlarge and Dsmall, into the same floating node (FN), may be used followed by one CDS readout. The timing diagram for such a configuration is shown in FIG. 6.

Figure 6:
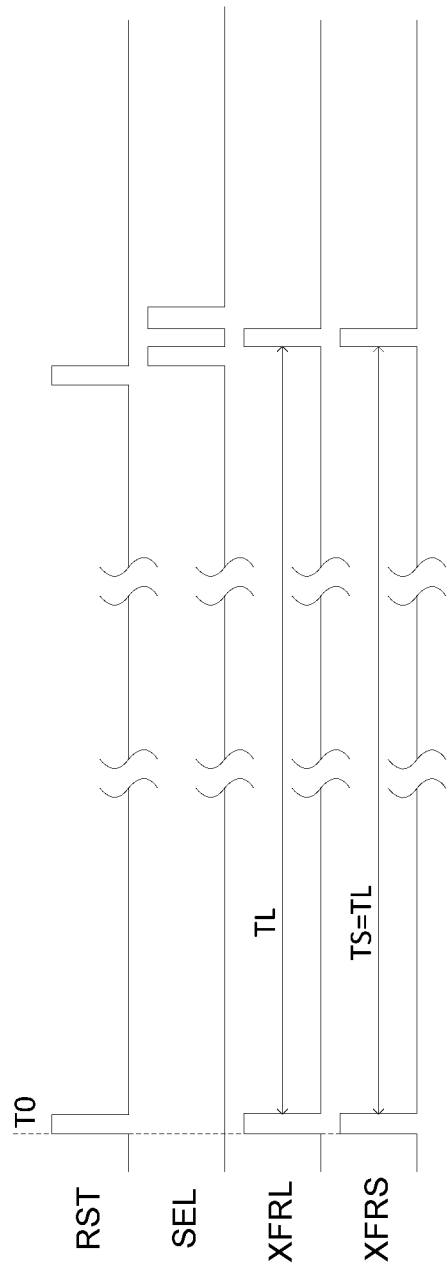
FIG. 6 is an exemplary timing diagram of a two-diode pixel which may be used in low-light situations.

Under the mode of operation illustrated in FIG. 6, both diodes may be reset simultaneously at time T0 by setting RST, XFRL, and XFRS all high. After that, both diodes start accumulating photo-electrons. After TL integration time, and with TS set to equal TL, CDS operation may begin: first the FN is reset by setting RST high. Following this, SEL may turn on to read out the reset level of the FN. After this, both XFRL and XRFS may be set high and accumulated charges from both photodiodes may be transferred to FN, followed by one more readout of the reduced FN level. This operation allows the use of only one readout, which minimizing noise contributions from the readout process while charges from both photodiodes are added up to boost signal level. Thus, this process may result in a high signal-to-noise ratio.

In general, for the dual-diode pixel described herein, under low light level, it is usually beneficial to operate it under the binning mode by setting both TL and TS the same and using full frame integration time to increase signal level. Further analog and/or digital gain can be also applied. As light level increases, signal level from one of the photodiodes may saturate, and the pixel describe herein may be configured to switch the operation mode to WDR mode having different TL and TS times. In general, TS may be shorter than TL in order to boost pixel dynamic range, as described above.

Figure 7:
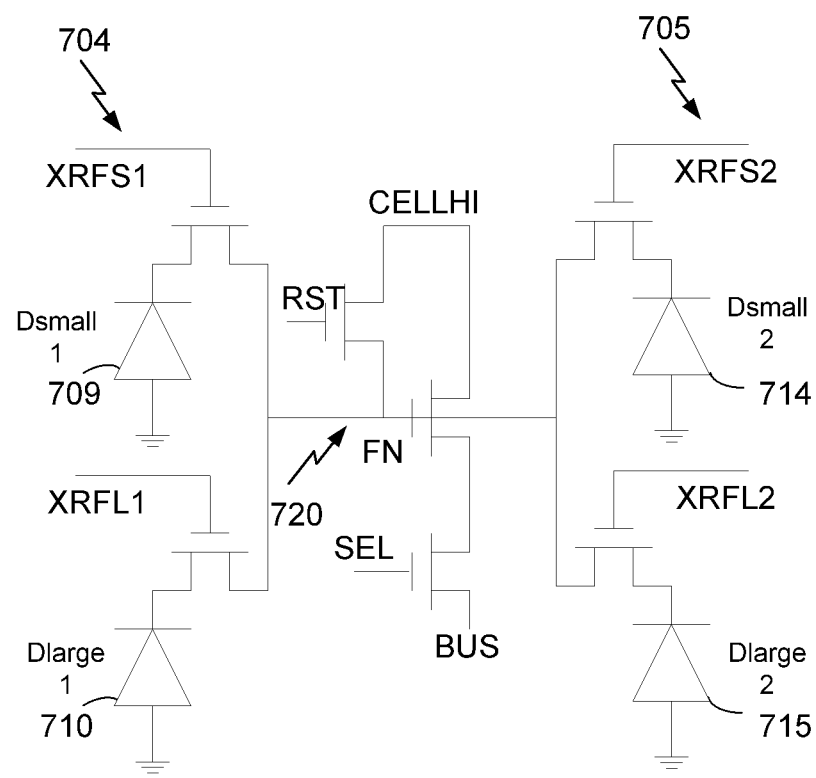
FIG. 7 is an schematic illustration of two neighboring pixels, either in the same row or same column, with a total of 4 photodiodes which share one set of common transistors.

While the previously-described pixels contained a small photodiode and a large photodiode which shared the same reset and readout transistors, some of these pixels may also share such common elements in order to further improve the fill factor of the layout. For example, two neighboring pixels 704 and 705, either in the same row or same column, with a total of 4 photodiodes, Dsmall1 709, Dlarge1 710, Dsmall2 714 and Dlarge2 715, can share one set of common transistors 720, as shown in FIG. 7. Depending on the sharing architecture, operation timing can be adjusted accordingly. For example, if horizontal sharing is implemented, then there may be four readout CDS operations in each line time: one each to readout Dlarge1 710, Dsmall1 709, Dlarge2 715, and finally Dsmall2 714.

Thus, such a dual diode pixel may enable a WDR operation when needed, such as in scenes with a high level of dynamic range, such as outdoors. A dual-diode pixel may include a small and a large photodiode and contain certain supporting circuits. The two photodiodes may be designed to support different integration time. Under low light situations, the dual-diode pixel may be operated under binning mode to boost SNR, with the same integration time for both photodiodes. Under WDR mode, the integration time for the large and small photodiodes may be different, typically with TS less than TL. Dynamic range may be extended when the ratio of TL to TS becomes very large. By changing TL and TS separately, the dynamic range of such a pixel may be extended while minimizing the loss of SNR. This approach may maintain image resolution and may not introduce additional motion artifacts, while extending the sensor's dynamic range.

Figure 8:
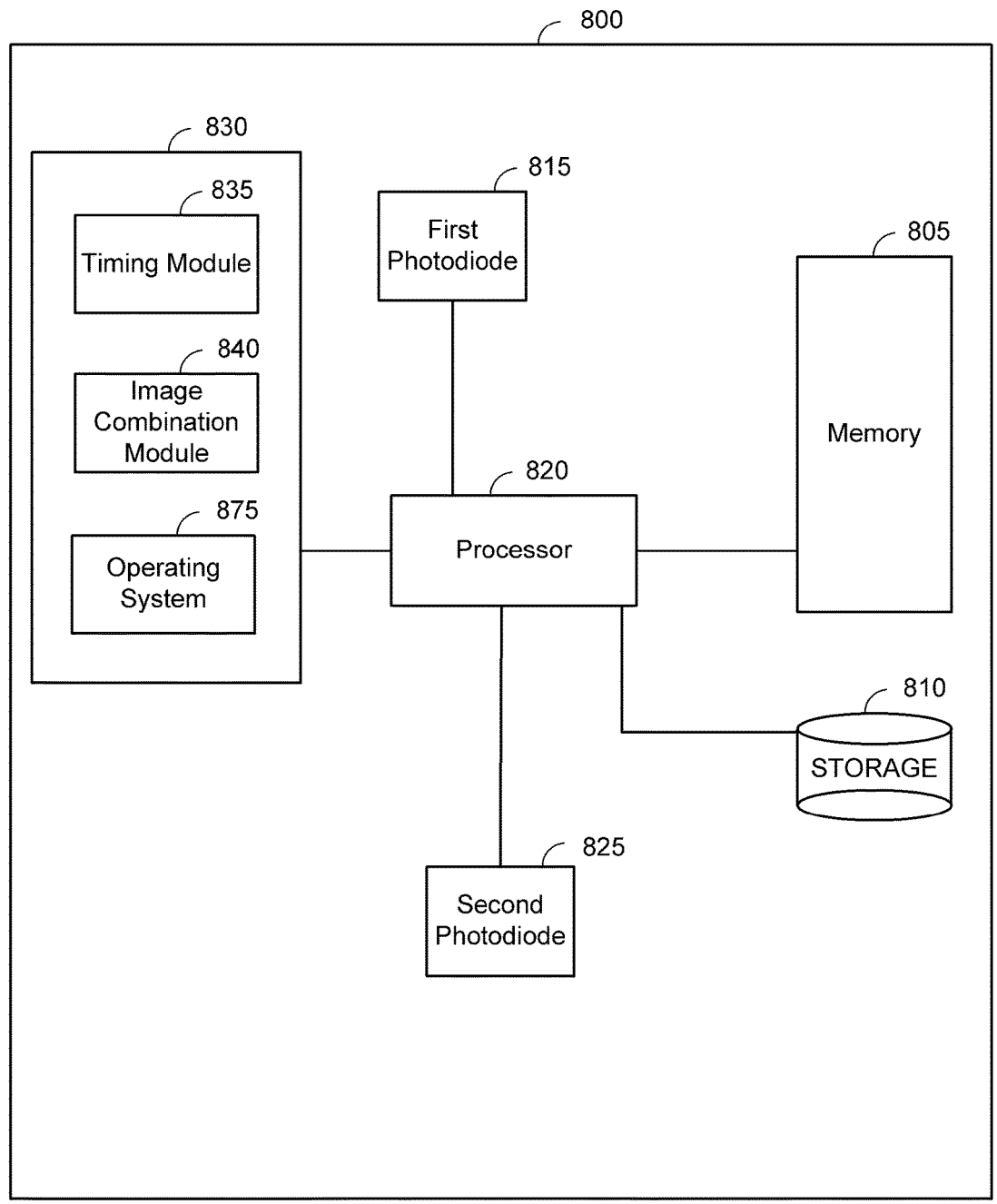
FIG. 8 depicts a high-level block diagram of a device having a set of components for combining readout values from photodiodes.

FIG. 8 depicts a high-level block diagram of a device 800 having a set of components including a processor 820 operatively coupled to a first photodiode 815 and a second photodiode 825 which are both within the same pixel 800. A working memory 805, storage 810, and memory 830 are also in communication with and operative attached to the processor. Device 800 may be a device configured to take digital photograhs, such as a digital camera, a cell phone, or another device. The first photodiode 815 and the second photodiode 825 may be part of a dual-diode pixel. A number of such pixels may be included on the device 800.

Processor 820 may be a general purpose processing unit or a processor specially designed for the disclosed methods. As shown, the processor 820 is connected to a memory 830 and a working memory 805. In the illustrated embodiment, the memory 830 stores a timing module 835, image combination module 840, and operating system 875. These modules include instructions that configure the processor to perform various tasks. Working memory 805 may be used by processor 820 to store a working set of processor instructions contained in the modules of memory 830. Alternatively, working memory 805 may also be used by processor 820 to store dynamic data created during the operation of device 800.

As mentioned above, the processor 820 is configured by several modules stored in the memories. For example, the timing module 835 may include instructions that configure the processor 820 to determine timings for the first photodiode 815 and the second photodiode 825. In some aspects, these timings may be the same for each photodiode, or may differ, based on external conditions.

The memory 830 may also contain an image combination module 840. The image combination module 840 may contain instructions that configure the processor 820 to receive signals from the first photodiode 815 and the second photodiode 825, and combine the signals from the photodiodes in such a way as to create an image. In some aspects, this image may include information received from one or both photodiodes. In some aspects, the image combination module 840 may be configured to store this image in the memory 805 or the storage 810.

Operating system module 875 configures the processor to manage the memory and processing resources of device 800. For example, operating system module 875 may include device drivers to manage hardware resources such as the first photodiode 815, storage 810, or second photodiode 825. Therefore, in some embodiments, instructions contained in modules discussed above may not interact with these hardware resources directly, but instead interact through standard subroutines or APIs located in operating system component 875. Instructions within operating system 875 may then interact directly with these hardware components.

Processor 820 may write data to storage module 810. While storage module 810 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 8 depicts a device having separate components to include a processor, first and second photodiodes, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 8 illustrates two memory components, to include memory component 830 having several modules, and a separate memory 805 having a working memory, one with skill in the art would recognize several embodiments utilizing different memory architectures. For example, a design may utilize ROM or static RAM memory for the storage of processor instructions implementing the modules contained in memory 830. Alternatively, processor instructions may be read at system startup from a disk storage device that is integrated into device 800 or connected via an external device port. The processor instructions may then be loaded into RAM to facilitate execution by the processor. For example, working memory 805 may be a RAM memory, with instructions loaded into working memory 805 before execution by the processor 820.

Figure 9:
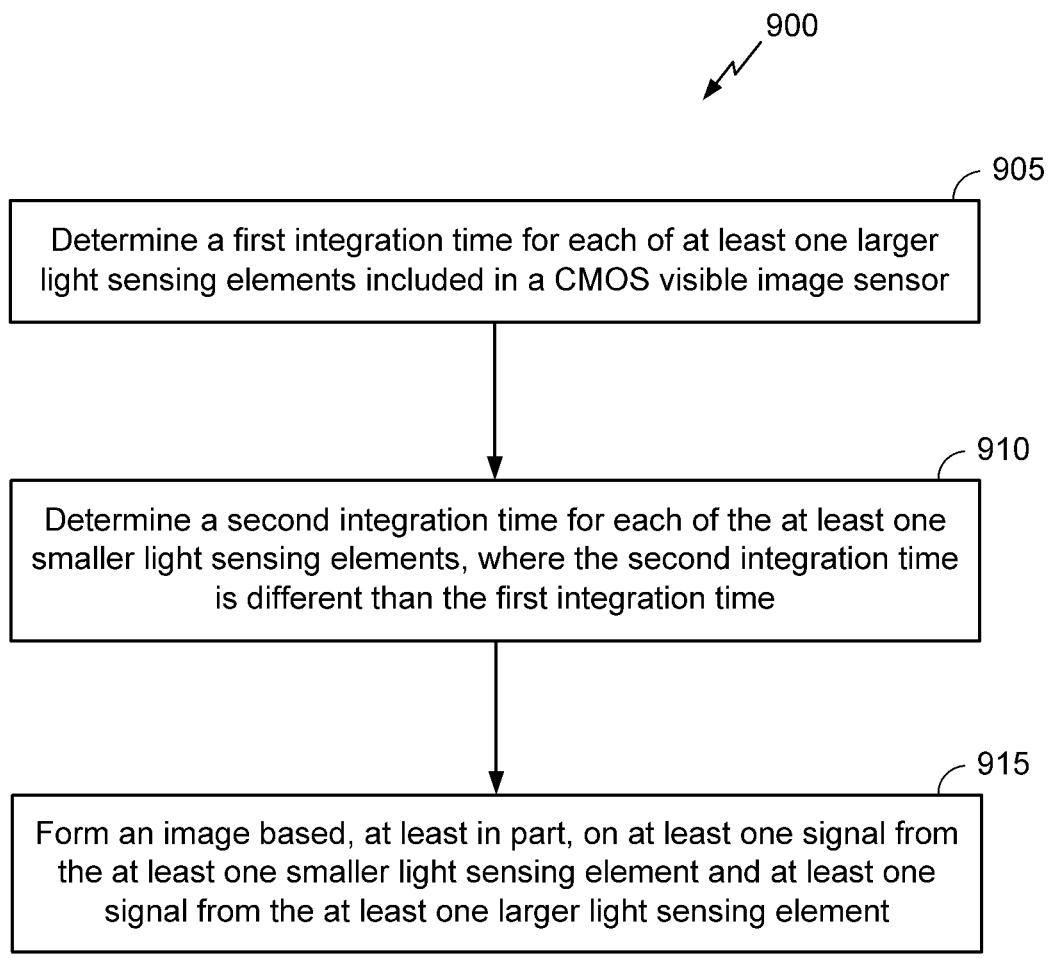
FIG. 9 is an illustration of a method of using a dual-diode device.

FIG. 9 is an illustration of a method of using a dual-diode device. This method may be done by a device, such as device 800.

At block 905, the method includes determining a first integration time for each of at least one larger light sensing element included in a CMOS visible image sensor. For example, the first integration time may be determined based, at least in part, on lighting conditions observed by the at least one larger light sensing element. In some aspects, the means for determining this may include a processor.

At block 910, the method includes determining a second integration time for each of the at least one smaller light sensing elements, where the second integration time is different than the first integration time. In some aspect, the means for determining this may include a processor.

At block 915, the method may form an image based, at least in part, on at least one signal from the at least one smaller light sensing element and at least one signal from the at least one larger light sensing element. In some aspects, the image may be formed based on a combination of the signals from the larger and smaller element or elements. In some aspects, the means for forming an image may include a processor.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-9 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of capturing an image with an image sensor comprising a plurality of pixels, comprising:
   providing a first well capacity via a first light sensing element of a pixel of the plurality of pixels;
   providing a second well capacity via a second light sensing element of the pixel of the plurality of pixels, wherein the second well capacity is greater than the first well capacity;
   determining a first integration time for the first light sensing element of the pixel; and
   determining a second integration time for the second light sensing element of the pixel, where the second integration time is different than the first integration time; and
   sharing one or more transistors between the first light sensing element and the second light sensing element of each pixel, the shared one or more transistors being integrated within the pixel comprising the first light sensing element and the second light sensing element.

2. The method of claim 1, further comprising:
   forming an image based, at least in part, on at least one signal from the first light sensing element of the pixel and at least one signal from the second light sensing element of the pixel.

3. The method of claim 2, wherein forming an image comprises forming an image based at least in part on a formula:

$$T_{hdr}(x,y)=(1-\alpha(x,y))\cdot T1(x,y)+\alpha(x,y)\cdot T2(x,y)$$

where T1 is a readout value of the first light sensing element of the pixel, T2 is a readout value of the second light sensing element of the pixel, $T_{hdr}$ is a combined image, and where $$\alpha(x,y) = \frac{1}{1+e^{-a(MAD(x,y)-b)}}$$

where a and b are tuning parameters which control a transition width and where MAD is a local mean absolute difference value, defined as $$MAD(x, y) = \left(\sum_{i,j \in W(x,y)} |T1(i, j) - R \times T2(i, j)|\right)/N.$$

where N is a total number of pixels within a window W(x,y) centered at pixel (x,y).

4. The method of claim 1, wherein the image is a high dynamic range image.

5. The method of claim 1, wherein at least one of the first light sensing element of the pixel and the second light sensing element of the pixel are photodiodes.

6. The method of claim 1, wherein the second integration time is shorter than the first integration time.

7. The method of claim 1, wherein at least one of the first integration time and the second integration time are determined based, at least in part, on lighting conditions.

8. An electronic device, comprising:
a CMOS visible image sensor comprising a plurality of pixels, wherein a pixel of the plurality of pixels includes a first light sensing element with a first well capacity and a second light sensing element with a second well capacity, where the second well capacity is greater than the first well capacity, wherein the first light sensing element and the second light sensing element of each pixel share one or more transistors, the shared one or more transistors being integrated within the pixel comprising the first light sensing element and the second light sensing element; and
a processor configured to:
determine a first integration time to be used for the first light sensing element of the pixel; and
determine a second integration time to be used for the second light sensing element of the pixel, where the second integration time is different than the first integration time.

9. The device of claim 8, wherein at least one of the first light sensing element of the pixel and the second light sensing element of the pixel comprises a photodiode.

10. The device of claim 8, wherein the second integration time is shorter than the first integration time.

11. The device of claim 8, wherein the processor is configured to determine a first integration time based at least in part on lighting conditions.

12. The device of claim 8, wherein the processor is configured to determine a second integration time based at least in part on lighting conditions.

13. The device of claim 8, wherein the processor is further configured to generate an image, the image based at least in part on signals from one or more of the first light sensing element and the second light sensing element.

14. The device of claim 13, wherein forming an image comprises forming an image based, at least in part, on a formula:

$$T_{hdr}(x,y) = (1-\alpha(x,y)) \cdot T1(x,y) + \alpha(x,y) \cdot T2(x,y)$$

where T1 is a readout value of the first light sensing element of the pixel, T2 is a readout value of the second light sensing element of the pixel, $T_{hdr}$ is a combined image, and where $$\alpha(x, y) = \frac{1}{1 + e^{-a(MAD(x,y)-b)}}$$

where a and b are tuning parameters which control a transition width and where MAD is a local mean absolute difference value, defined as $$MAD(x, y) = \left(\sum_{i,j \in W(x,y)} |T1(i, j) - R \times T2(i, j)|\right)/N.$$

where N is a total number of pixels within a window W(x,y) centered at pixel (x,y).

15. The device of claim 13, wherein the image is a high-dynamic range image.

16. An electronic device comprising:
means for determining a first integration time for a first light sensing element with a first well capacity included in a pixel of a plurality of pixels included in a CMOS visible image sensor; and
means for determining a second integration time for a second light sensing element with a second well capacity included in the pixel of the plurality of pixels included in the CMOS visible image sensor, where the second integration time is different than the first integration time and where the second well capacity is greater than the first well capacity; and
wherein the first light sensing element and the second light sensing element of each pixel share one or more transistors, the shared one or more transistors being integrated within the pixel comprising the first light sensing element and the second light sensing element.

17. The device of claim 16, further comprising:
means for forming an image based, at least in part, on at least one signal from the first light sensing element of the pixel and at least one signal from the second light sensing element of the pixel.

18. The device of claim 17, wherein means for forming an image comprises means for forming an image based, at least in part, on a formula:

$$T_{hdr}(x,y) = (1-\alpha(x,y)) \cdot T1(x,y) + \alpha(x,y) \cdot T2(x,y)$$

where T1 is a readout value of the first light sensing element of the pixel, T2 is a readout value of the second light sensing element of the pixel, $T_{hdr}$ is a combined image, and where $$\alpha(x, y) = \frac{1}{1 + e^{-a(MAD(x,y)-b)}}$$

where a and b are tuning parameters which control a transition width and where MAD is a local mean absolute difference value, defined as $$MAD(x, y) = \left(\sum_{i,j \in W(x,y)} |T1(i, j) - R \times T2(i, j)|\right)/N.$$

where N is a total number of pixels within a window W(x,y) centered at pixel (x,y).

19. The device of claim 16, wherein the image is a high dynamic range image.

20. The device of claim 16, wherein at least one of the first light sensing element of the pixel and the second light sensing element of the pixel are photodiodes.

21. The device of claim 16, wherein the second integration time is shorter than the first integration time.

22. The device of claim 16, wherein at least one of the first integration time and the second integration time are determined based, at least in part, on lighting conditions.

23. A non-transitory, computer readable storage medium comprising instructions executable by a processor of an apparatus, that causes the apparatus to:
capture an image using a CMOS visible image sensor comprising a plurality of pixels, wherein a pixel of the plurality of pixels includes a first light sensing element with a first well capacity and a second light sensing element with a second well capacity, the second well capacity greater than the first well capacity;
share one or more transistors between the first light sensing element and the second light sensing element of each pixel, the shared one or more transistors being integrated within the pixel comprising the first light sensing element and the second light sensing element;
determine a first integration time for the first light sensing element of the pixel; and
determine a second integration time for the second light sensing element of the pixel, where the second integration time is different than the first integration time.

24. The non-transitory, computer readable storage medium of claim 23, further comprising instructions that cause the apparatus to:
generate an image based, at least in part, on at least one signal from the first light sensing element of the pixel and at least one signal from the second light sensing element of the pixel.

25. The non-transitory, computer readable storage medium of claim 24, wherein the generated image is based, at least in part, on a formula:

$$T_{hdr}(x,y) = (1-\alpha(x,y)) \cdot T1(x,y) + \alpha(x,y) \cdot T2(x,y)$$

where T1 is a readout value of the first light sensing element of the pixel, T2 is a readout value of the second light sensing element of the pixel, $T_{hdr}$ is a combined image, and where $$\alpha(x,y) = \frac{1}{1 + e^{-a(MAD(x,y)-b)}}$$

where a and b are tuning parameters which control a transition width and where MAD is a local mean absolute difference value, defined as $$MAD(x,y) = \left(\sum_{i,j \in W(x,y)} |T1(i,j) - R \times T2(i,j)|\right)/N.$$

where N is a total number of pixels within a window W(x,y) centered at pixel (x,y).

26. The non-transitory, computer readable storage medium of claim 23, wherein the image is a high dynamic range image.

27. The non-transitory, computer readable storage medium of claim 23, wherein at least one of the first light sensing element of the pixel and the second light sensing element of the pixel are photodiodes.

28. The non-transitory, computer readable storage medium of claim 23, wherein the second integration time is shorter than the first integration time.

29. The non-transitory, computer readable storage medium of claim 23, wherein at least one of the first integration time and the second integration time are determined based, at least in part, on lighting conditions.

* * * * *